March 10, 1959 A. M. ANGEL ET AL 2,877,012

TAPE STOPPING MECHANISM

Filed Feb. 7, 1958 3 Sheets-Sheet 1

INVENTORS:
ARTHUR M. ANGEL
RICHARD G. FISHER

BY Louis A. Kline
John J. Matlago
THEIR ATTORNEYS

INVENTORS:
ARTHUR M. ANGEL
RICHARD G. FISHER
BY Louis A. Kline
John J. Matlago
THEIR ATTORNEYS INVENTORS:
ARTHUR M. ANGEL
RICHARD G. FISHER
BY Louis A Kline
John J. Matlago
THEIR ATTORNEYS United States Patent Office 2,877,012

Patented Mar. 10, 1959

2,877,012

TAPE STOPPING MECHANISM

Arthur M. Angel, Rolling Hills Estates, and Richard G. Fisher, Torrance, Calif., assignors to The National Cash Register Company, Dayton, Ohio, a corporation of Maryland Application February 7, 1958, Serial No. 713,888

6 Claims. (Cl. 271—2.3)

The present invention relates to tape-transport mechanisms for moving information-carrying tapes relative to a fixed reading station, and more particularly to an arrangement of such a mechanism for stopping fast-moving tapes very quickly, in the short distance between successive information-carrying parts of the tape.

The means for abstracting information from tapes are now well known in the art and comprise, preferably, for example, optical or magnetic reading stations and appropriate electronic equipment. Such means operate extremely rapidly and the rate at which information is abstracted from a tape is limited, therefore, by the rapidity with which the mechanical operation of controlling the movement of the tape may be carried out. It is therefore highly desirable, in tape-reading machines, to be able to mechanically transport the tape at as high a rate as possible past the reading station. However, it is necessary to be able to stop the tape at will and since the characters on a tape are very closely spaced, if no information is to be lost, a fast-moving tape must be stopped very quickly in an interval less than the distance between successive characters. In this way it is possible to avoid the provision of auxiliary means, such as a buffer register, for temporarily storing the information gathered during a slower stopping. The more quickly a tape is stopped, however, the larger are the forces applied to the tape during stoppage and the problem of handling these forces so as to prevent damage to the tape during stoppage is therefore accentuated. Thus it is this problem of stopping the tape without damaging the tape which really limits the speed of the tape during normal reading operations. The object of the present invention is to provide a novel means of solving this problem, thereby permitting practical running speeds which are several times as great as those attainable with mechanisms of the prior art.

Another object of the invention is to provide a tape-transport mechanism intended for use with punched tapes made of materials such as paper, for instance, which have limited tensile strength and which may break if the tensions induced in the tape during stoppage are more than moderately large.

The invention contemplates, in a tape-transport mechanism, the provision of means for constraining a short portion of the tape to follow a horizontal plane path. Along the horizontal path are disposed, in order in the direction of motion, a main brake, the reading station, driving means, and a deflector which deflects the tape downward into a basket. Disposed beneath the tape and between the driving means and the deflector is a tape-stop, which, together with the deflector, constitutes an important feature of the invention, and which serves to prevent the tensions induced in the tape during stoppage from exceeding safe limits.

The main brake and the driving means are primarily employed to control the motion of only the horizontal portion of the tape; other means are provided for controlling the motion of the remainder of the tape. For purposes of control, the horizontal portion is isolated from the remainder of the tape by means of isolating loops. Since the horizontal section is short it has very little mass and can be stopped very quickly and easily. The remainder of the tape, and the reels and their driving means, having much greater masses, must be stopped more leisurely, thereby avoiding the large stresses which would be set up therein if the whole apparatus were to be stopped as quickly as the horizontal section. The main brake is preferably of the electromagnetic type; the tape rides on the stator, and the armature, when not energized, rests lightly or "floats" on the tape, thereby imposing a slight drag on the tape. The driving means comprise a continuously driven capstan on which the tape rides, and a pinch-roller which is disposed above the tape and opposite the capstan. When it is desired to drive the tape, the pinch-roller is made to press the tape against the capstan. To stop the tape, the brake is actuated, and at the same instant, the pinch-roller is lifted away from the tape.

After the horizontal portion of tape is stopped by the brake, the motion of the downward moving portion following the horizontal portion must be arrested without damage to the tape. The downward moving portion of tape has an effectively greater mass than the horizontal portion and the stopping of the downward moving portion is safely accomplished by means of the tape-stop. The tape-stop is disposed below the tape between the driving capstan and the deflector, and in the preferred embodiment the working surface of the tape-stop is smoothly rounded at the edge facing the deflector. In stopping the downward moving portion of tape, the tape-stop performs a double function as will now be explained. After the horizontal portion of the tape has stopped, the momentum of the downward moving portion causes a downward pull to be exerted on the part of the horizontal portion between the tape-stop and the deflector. Owing to the pliability of the tape and to the fact that the tape-stop is substantially displaced from the deflector horizontally, the arresting of the motion of the downward part of the tape will not begin until an appreciable interval of time has elapsed after the stopping of the horizontal portion of the tape. During this interval of time a first tension induced in the tape by the stopping of the horizontal portion of the tape will be dissipated. A second tension induced in the tape by the stopping of the downward portion of the tape therefore appears only after the first tension has been dissipated. Thus the appearance of excessive tension in the tape upon stoppage is avoided, because the two tensions cannot combine. Moreover, the second tension will not be excessive in itself, because of the rounding of the edge of the tape-stop facing the deflector, and because of the pliability of the tape. In assuming the contour of the working surface of the tape-stop, the line of contact of the tape and the tape-stop will advance smoothly along the rounded edge of the latter. The momentum of the downward moving part of the tape will thereby be smoothly and progressively transformed into tension in the preceding portion of the tape. A plot of this tension against time shows a smoothly humped curve, the amplitude varying inversely as the length of the arc of the rounded edge of the tape-stop. In general, the greater the length of the arc, the longer will be the interval of time during which the momentum of the downward moving portion of tape is transformed into tension, and therefore the less will be the magnitude of the tension. Thus it is seen that the amount of rounding of the edge of the tape-stop determines the magnitude of the second tension, and that the displacement of the tape-stop back from the deflector ensures that the second tension will be delayed until the first tension has dissipated. The main brake, of course, must have sufficient clamping pressure to withstand the second tension and prevent jerking of the tape.

A preferred embodiment of the invention will now be described with reference to the accompanying drawings wherein.

Figure 4:
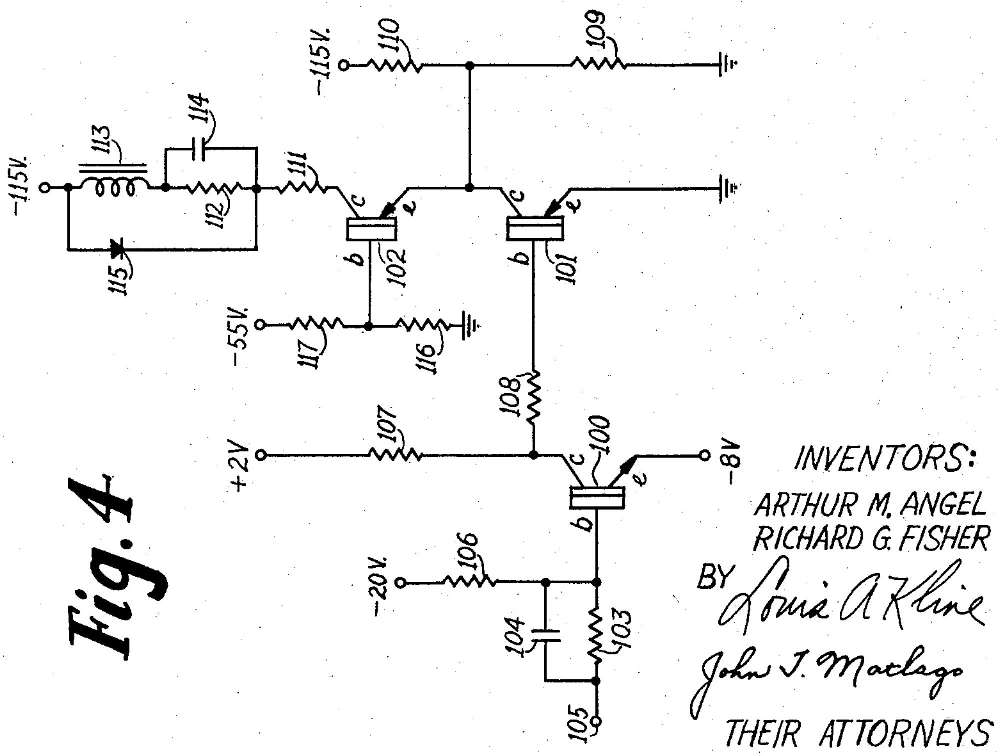
Fig. 4 is a schematic diagram of a preferred embodiment of an electronic circuit used to provide energizing current for the stator windings of an electromagnet used in the apparatus of Fig. 1.

Figs. *5a*, *5b*, and *5c* show some of the electrical waveforms appearing at various points in the circuit of Fig. 4.

Figure 1:
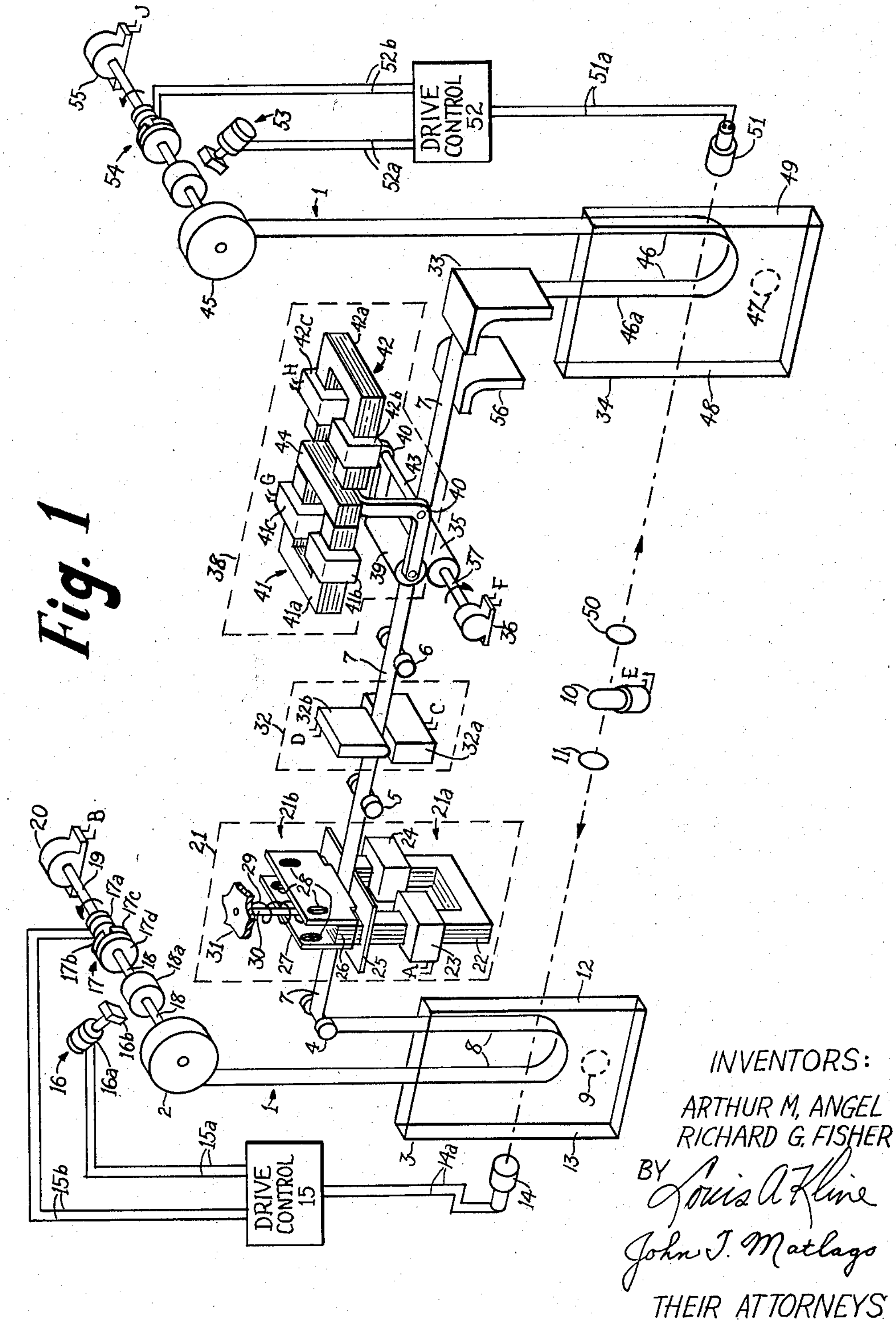
Fig. 1 is an isometric schematic view of a tape-reading and transport mechanism in accordance with the invention.

Refer now to the drawings and particularly to Fig. 1, wherein is shown a preferred embodiment of the invention. Reference numeral 1 indicates a punched record tape which is being fed from a supplying reel 2 into a first basket 3. From first basket 3 the tape passes over tape-guides 4, 5, and 6, which are disposed along a horizontal plane. A short portion 7 of the tape 1 is thus guided along a horizontal path. The tape 1 is arranged to have a single loop 8 in first basket 3. The shape of the loop 8 is maintained as shown by the aid of a downdraft of air. The downdraft is produced by continuously removing air through an opening 9 near the bottom of first basket 3. The length of loop 8 is controlled by the means now to be described. A lamp 10 provides a source of illumination. Some of the light from lamp 10 is focused by means of a lens 11 through the sides 12 and 13 of first basket 3, which sides can be made of transparent material for this purpose or can have holes cut therein, onto a photodiode 14. In Fig. 1, loop 8 is shown as being long enough to shade photodiode 14 from the light from lamp 10. The current from photodiode 14 therefore has a low value. If loop 8 is shortened so as to expose photodiode 14 to the light from lamp 10, then the current from photodiode 14 has a high value. The current from photodiode 14 is fed by way of leads **14*a* to a reel-drive control unit 15, which is designed to actuate either an electromagnetic brake 16 by way of leads 15*a*, or an electromagnetic clutch 17, by way of leads 15*b*, but not both simultaneously, according to whether the value of the current from photodiode 14 is low or high. Electromagnetic brake 16 comprises a solenoid 16*a* and a brake-shoe 16*b*. When brake-solenoid 16*a* is energized by reel-drive control unit 15, brake-shoe 16*b* engages a brake wheel 18*a* which is fixed to a reel shaft 18 which in turn is fixed to supplying reel 2, and the rotation of reel 2** is thereby stopped.

Electromagnetic clutch 17 comprises a clutch solenoid **17*a*, pole plates 17*b* and 17*c*, and a clutch plate 17*d*. The clutch solenoid 17*a* is deenergized at the same instant that brake-solenoid 16*a* is energized. The clutch plate 17*d* is thereby disengaged from pole plates 17*b* and 17*c* and also from reel shaft 18 by means well understood in the art. The pole plates 17*b* and 17*c* and the clutch solenoid 17*a* are fixed to a coupling shaft 19 which is continuously driven by a motor 20. The disengaging of clutch plate 17*d* therefore prevents the motor 20 from loading the electromagnetic brake 16 when the supplying reel 2 is to be stopped. To start the supplying reel 2, the electromagnetic brake 16 is deenergized, and the clutch solenoid 17*a* is energized, by the reel-drive control unit 15. By these means, therefore, the supplying reel 2 is stopped or started according to whether loop 8** of the tape is too long or too short.

Between tape guides 4 and 5 is disposed a main brake 21, comprising a main-brake stator **21*a* and a main-brake armature 21*b*. Main-brake stator 21*a* comprises core laminations 22, serial windings 23 and 24, and a plate 25. The main-brake stator 21*a* is disposed in a fixed position beneath the tape so that the tape rides on the smooth upper surface of plate 25. Main-brake armature 21*b* comprises laminations 26 and casing 27 in which are four vertically elongated holes 28, disposed oppositely in pairs. The holes 28 allow main-brake armature 21*b* to move vertically on two horizontally disposed fixed pins (not shown). Main-brake armature 21*b* rides lightly on the tape and exerts a light and even pressure over the entire width of the tape, the amount of pressure being adjusted by means of a light spring 29. Spring 29 is positioned on a pin 30 which is screwed into a fixed plate 31 (shown cut away) so that the upper end of spring 29 pushes against plate 31 and the lower end of spring 29 pushes against laminations 26**.

Between tape-guides 5 and 6 is disposed an optical reading station 32 which comprises an illuminator **32*a* disposed beneath and close to the tape, and a reader 32*b* disposed above and close to the tape. The tape passes between illuminator 32*a* and reader 32*b***, which cooperate to abstract information from the tape in a manner well understood in the art.

At the end of the horizontal portion 7 of the tape is disposed a deflector 33 which deflects the tape vertically downward into a second basket 34. The deflecting surface of deflector 33 is smoothly rounded concavely. Between deflector 33 and tape-guide 6 and beneath the tape is a drive-capstan 35, which is continuously driven by a motor 36 through a coupling shaft 37. The tape rides on drive-capstan 35, the axis of rotation of which is perpendicular to the longitudinal axis of the tape. Above the drive-capstan 35 and above the tape is located a pinch-roller assembly 38 which comprises a pinch-roller 39, a right-angled holding frame 40, a drive-stator 41 and a stop-stator 42, a pivot pin 43 and a second armature 44. The pinch-roller 39 is disposed as shown between one pair of arms of the holding frame 40 which is supported by and can rotate on pivot pin 43 which is fixed. The second armature 44 is attached to the other pair of arms of the holding frame 40. Drive-stator 41 comprises core laminations **41*a* and serial windings 41*b* and 41*c*, and stop-stator 42 comprises core laminations 42*a* and serial windings 42*b* and 42*c*. Pinch-roller assembly 38 is so positioned that pinch-roller 39 is parallel to and directly above drive-capstan 35. Drive-stator 41 and stop-stator 42 are so disposed, on opposite sides of second armature 44, that when second armature 44 is attracted to drive-stator 41, pinch-roller 39 presses the tape against drive-capstan 35, thereby applying driving force to the horizontal portion 7 of the tape. When second armature 44 is attracted to stop-stator 42, pinch-roller 39** is lifted away from the tape and driving force is thereby removed from the tape.

From second basket 34 the tape 1 is wound onto a take-up reel 45. The arrangement and the control of the tape in second basket 34 are similar to the arrangement and the control of the tape in first basket 3. In second basket 34, the tape is arranged to have a single loop 46 as shown. The shape of loop 46 of tape is maintained by a downdraft of air, which is created by removing air from second basket 34 through an opening 47 near the bottom of the basket. Sides 48 and 49 of second basket 34 are made similarly to the sides 12 and 13 of basket 3, so that light from lamp 10 can be focused therethrough by means of a lens 50 onto a photodiode 51. Current from photodiode 51 is fed by way of leads **51*a* to a take-up reel-drive control unit 52 which is similar to supplying reel-drive control unit 15, and which controls the motion of take-up reel 45 in the same way as supplying reel 2 is controlled. That is, take-up reel-drive control unit 52 actuates either an electromagnetic brake 53, by way of leads 52a, or an electromagnetic clutch 54, by way of leads 52b, to either stop or start take-up reel 45 accordingly as loop 46 of tape is too short or too long. The driving force for take-up reel 45 is provided by a motor 55, in the same way as motor 20 provides driving force for supplying reel 2**.

From the foregoing it is seen that, for purposes of starting and stopping, tape 1 may be considered as being in three sections. The first section is loop 8 and the amount of tape on supplying reel 2. The second section is the horizontal portion 7. The third section is loop 46 and the amount of tape on take-up reel 45. The travel of the second section, horizontal portion 7, is controlled by means of main-brake 21, drive-capstan 35, and pinch-roller assembly 38. The travel of the horizontal portion 7 causes loop 8 to shorten and loop 46 to lengthen. The lengths of loops 8 and 46 are monitored by means of lamp 10 and photodiodes 14 and 51, and reels 2 and 45 are controlled as described above so as to maintain fairly constant lengths of these loops. Thus the starting and the stopping of the entire tape 1 is dependent on the motion of the horizontal section 7. Main-brake 21, drive-capstan 35, and pinch-roller assembly 38 therefore indirectly control the motion of the entire tape, but directly they need to control only the horizontal portion 7. The length of horizontal portion 7 is shown exaggerated for purpose of illustration. Actually it is no longer than required for the spacing of main-brake assembly 21, reading station 32, tape guides 5 and 6, drive-capstan 35, and deflector 33.

One point remains to be discussed in the stopping of the tape. In order to keep the tension in the tape to a minimum when the motion of the tape is arrested, it is necessary to avoid having to stop the downward moving portion 46a of loop 46 at the same instant that the horizontal portion 7 is stopped. It can easily be seen that if deflector 33, which is disposed above the tape, is replaced by a tape-guide disposed below the tape similar to tape-guide 4, then main brake 21 would have to stop both the horizontal portion 7 of the tape and the downward moving portion 46a of loop 46 simultaneously. This would require a longer stopping time or would mean that greater tension would be induced in the tape. However, the present invention avoids this difficulty by having the deflector 33 disposed above the tape and having no structure at all under the tape where it changes direction at the deflector. Therefore, when the horizontal portion 7 of the tape is stopped by main brake 21, the downward moving portion 46a of loop 46 continues to move downward, dragging the end of horizontal portion 7 with it. In order to finally arrest the motion of portion 46a of loop 46, a tape-stop 56 is provided, disposed beneath the horizontal portion 7 of tape and between drive-capstan 35 and deflector 33. In the preferred embodiment the tape-stop 56 is displaced about one-half inch back from deflector 33 towards the drive-capstan 35 and the working surface thereof is smoothly rounded at the edge facing deflector 33. The horizontal portion 7 of tape rides on the smooth upper surface of tape-stop 56. The downward moving portion 46a of loop 46 is brought to rest by tape-stop 56 and the tension in the tape is kept to a minimum, as explained above in the introductory remarks.

The tape-stop 56 need not necessarily be fixed. With particularly weak tapes, the tape-stop could preferably be spring-mounted so as to recoil with the impact of the tape and/or could be made of resilient material. The shape of the working surface of tape-stop need not be the one shown in Fig. 1, so long as it presents a rounded surface to the tape at the place of impact. The tape-stop need not even be a solid structure, as it was found in practice that a jet of air directed at the curved portion of the tape at the deflector would serve to prevent breaking of the tape at this portion on stopping.

The energizing leads for the main-brake stator 21a and for the two stators 41 and 42 of the pinch-roller assembly are indicated at A, G, and H, respectively. Power is fed to motors 20, 36, and 55, to illuminator 32a, and to lamp 10, by way of leads B, F, J, C, and E, respectively. Signals from reader 32b are conducted by leads D.

Figure 2:
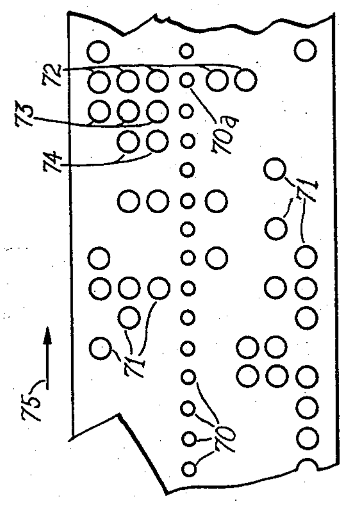
Fig. 2 shows a section of a typical punched paper tape handled by the tape transport mechanism of the present invention.

Fig. 2 shows a representative section 1a of a typical punched paper tape such as is used in the art. A longitudinal series of small holes 70 is positioned along the center of the tape. Each of these holes 70 defines a transverse row on the tape in which larger holes 71 are punched in accordance with a code, such that each transverse row represents a character or similar bit of information. Thus, as shown, three successive characters are indicated by reference numerals 72, 73, 74. The optical reading station 32 scans the row of small holes 70, as the tape 1 is fed therethrough, to generate a clock or timing signal. Optical reading station 32 is so designed that it senses the hole 70 associated with a character a little earlier than the other holes in a row such that the leading edge of a small hole initiates the activation of, for example, an associated computer. In this way the information represented by the characters associated with a particular small hole can be read by the computer at the instant that the character is centered in the reading station. This information bit read from the tape may represent a command to stop the movement of the tape, in which case the tape must be stopped before the leading edge of the next character enters the reading station. To consider a specific example, assume that the section 1a of tape is moving through reading station 32 from left to right as indicated by arrow 75 in Fig. 2. The leading edge of small hole 70a, which is associated with character 72, initiates the activation of the computer so that character 72 will be read as soon as it becomes centered in the reading station. If character 72 represents a command to stop, then the tape must be stopped before the leading edge of the next character 73 enters the reading station.

A stop signal may also be generated by the computer, owing to various conditions that may exist therein, as determined by the information being fed thereto and the information stored in its memory. Such a stop signal, generated by the computer, will coincide with a clock signal at the reading station, so that, again, the tape must be stopped before the arrival of the leading edge of the following character.

Figure 3:
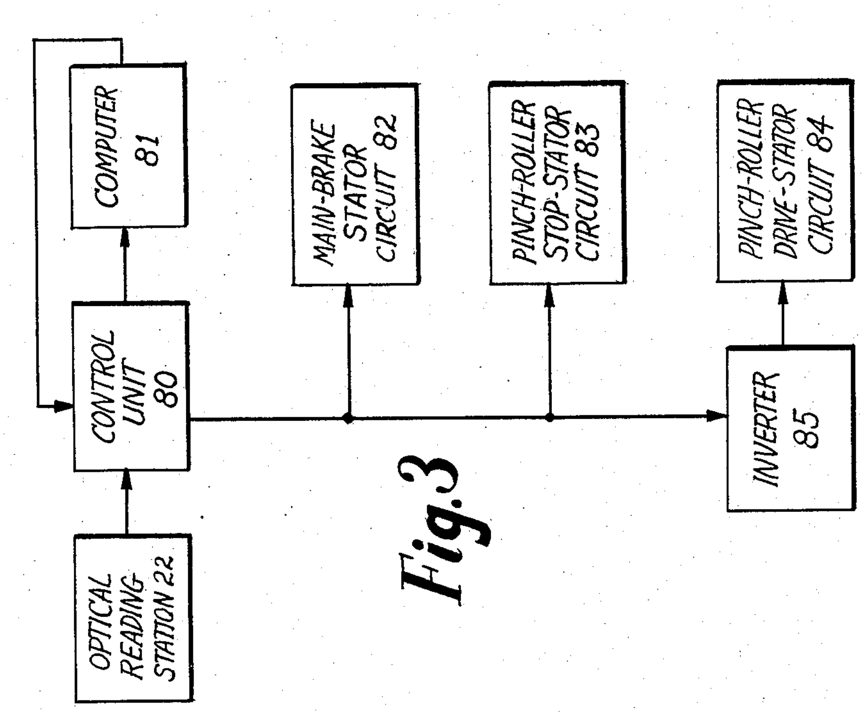
Fig. 3 is a block diagram showing schematically an arrangement of circuits which may be used to control the tape-transport mechanism of Fig. 1.

Fig. 3 shows schematically an arrangement of circuits used to control the energizing of the windings of the main-brake stator and the pinch-roller stators. Block 22 represents the optical reading station from which output signals are fed to a control unit 80. The control unit 80 passes stop signals to the stators and also feeds information to a computer 81. Amongst other functions, which are not indicated, the computer 81 feeds signals back to the control unit 80.

The stop signals are fed to three stator circuits, going directly to main-brake stator circuit 82 and pinch-roller stop-stator circuit 83. Before going to pinch-roller drive-stator circuit 84, however, the signals are shifted in phase by 180° by inverter 85; thus only one pinch-roller stator is energized at any given time. The three stator circuits are identical, and a preferred embodiment of one is shown in detail in Fig. 4.

The circuit of Fig. 4 will now be described. Reference numeral 100 indicates an n-p-n junction transistor of the type 2N94, and 101 and 102 indicate two p-n-p junction transistors of the type 2N174. The electrodes of these transistors are indicated by *b*, *c*, *e*, for base, collector, emitter, respectively. A resistor 103, in parallel with a capacitor 104, connects the base of transistor 100 to an input terminal 105. A second resistor 106 also connects the base of transistor 100 to a negative biasing potential of 20 volts. The emitter of transistor 100 is connected to a negative biasing potential of 8 volts. The collector of transistor 100 is connected to a positive biasing potential of 2 volts through a resistor 107, and also to the base of transistor 101 through a resistor 108. The emitter of transistor 101 is connected to ground. The collector of transistor 101 is connected to the emitter of transistor 102 and also to the junction of two resistors 109 and 110, which form a voltage-dividing network. The other end of resistor 109 is grounded, and the other end of resistor 110 is connected to a negative biasing potential of 115 volts. The base of transistor 102 is connected to a negative potential of 55 volts through a resistor 117 and also to ground through a resistor 116. The collector of transistor 102 is connected through a series circuit to a negative potential of 115 volts. This series circuit, in order from the collector comprises a resistor 111, a resistor 112 shunted by a capacitor 114, and a coil 113. Coil 113 represents the serial windings of one of the three stators of Fig. 1. In parallel with resistor 112 and coil 113 is a diode 115 having its anode connected to the negative potential, and its cathode connected to the junction of resistors 111 and 112.

Figure 5A:
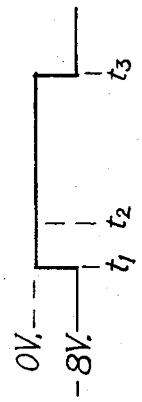
Figure 5B:
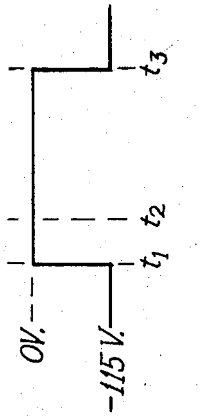
Figure 5C:
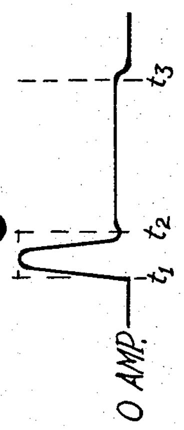

The action of the circuit of Fig. 4 can best be understood with reference to Fig. 5 which shows waveforms appearing at various points of the circuit. The biasing potentials shown in Fig. 4 are such that the transistors are not conducting when control unit 80 (Fig. 3) does not supply a signal on input terminal 105. In response to the application by control unit 80 of a stop signal to input terminal 105 at time $t_1$, the potential of input terminal 105 changes from a negative value of 8 volts to substantially zero value, as shown by the curve of Fig. 5*a*. This raises the potential of the base of transistor 100 sufficiently to cause the transistor to conduct, thus lowering the potential of its collector. This in turn causes transistor 101 to conduct heavily. Resistor 109 is thus effectively short-circuited and transistor 102 conducts. The potential of the collector of transistor 102 will therefore rise from a low value of −115 volts to approximately zero potential, as shown by the curve of Fig. 5*b*. This change of potential will be impressed across the series circuit, and current will begin to flow therethrough. This current will be initially large, since the capacitor 114 is uncharged at time $t_1$. Since the ohmic resistance of coil 113 is very small, the initial current is limited by resistor 111 only. As capacitor 114 charges, the current through it will decrease substantially to zero. The coil current will then flow through the resistors 111 and 112 in series, thus decreasing to a steady value at time $t_2$, as shown by the current waveform of Fig. 5*c*. At time $t_3$, the stop signal ends. The biasing potentials then cause the transistors to return to the non-conducting state. The tape 1 then again becomes driven at high speed.

The particular transistors 101 and 102 used in this embodiment of the circuit have a limited tolerance of 60 volts to potential differences between the emitter and the collector. It is therefore necessary to have two transistors in series, in view of the supply voltage being −115 volts. The diode 115 prevents damage to the transistors 101 and 102 from another cause. In cutting off the current a back E. M. F. is established which is sufficient to exceed the combined tolerance of the transistors. Diode 115 serves to short-circuit this back E. M. F. and therefore prevents the potential across the transistors 101 and 102 from becoming greater than the supply voltage.

The stopping of the tape will now be discussed with reference to Figs. 1 and 3. First assume that the tape is moving at its intended high speed. The pressure of main-brake armature **21*b* on the tape is just sufficient to maintain enough tension in the horizontal portion 7 to prevent any fluttering of this portion between main brake 21 and drive-capstan 35. Drive-stator 41 is in an energized condition, holding second armature 44, whereby driving force is applied to the tape, as explained above. There is no current flowing in main-brake stator 21*a* or in stop-stator 42. Now, on a stop signal from control unit 80, main-brake stator 21*a* and stop-stator 42 become energized and drive-stator 41 becomes deenergized. Thus main-brake armature 21*b* is pulled down, clamping the tape against main-brake stator 21*a* and at the same time the pinch-roller 39 is lifted upwards, removing the driving force from the tape. Thus braking pressure is applied to the horizontal section 7 of the tape at the same time that driving force is removed from it. The result is that the horizontal section 7 of the tape is stopped, and then the downward moving portion 46*a* of loop 46 is stopped by utilization of the deflector 33 and tape stop 56, as explained above. These stoppages in turn result in a lengthening of loop 8 and a shortening of loop 46, which cause the respective reels 2 and 45** to stop, as explained above.

In order to increase the speed of operation of the main-brake armature **21*b* and the second armature 44, the non-magnetic metallic parts of the armatures are made of light metals, such as aluminum. The speed of operation of pinch-roller 39 is similarly increased by the use of light metals in the non-magnetic moving parts of pinch-roller assembly 38**.

When the tape-transport mechanism is in operation, second armature 44 will be touching either drive-stator 41 or stop-stator 42, and there will be a gap between the armature and the other stator. In Fig. 1 this gap is shown between second armature 44 and stop-stator 42. This gap is shown large merely for purposes of illustration. It is highly desirable that this gap and the gap between main-brake armature **21*b* and main-brake stator 21*a*** be kept as narrow as possible, consistent with efficient operation. One reason is that the armatures then have the least distance to travel to perform their functions when a stop signal occurs; this reduces the time required for stopping. Another reason is that flux leakage is reduced as the gaps are narrowed; this means that for given currents in the stators the forces acting on the armatures will increase as the gaps decrease, apart from the usual factor proportional to the inverse square of the distance. Thus, for very narrow gaps the acceleration of the armatures will be very great.

The choice of magnetic material for the armatures and the stators is also important in obtaining optimum performance of the electromagnets. A material of high flux saturation density is desired in order to obtain a large magnetic force. The material should also have a low magnetic retentivity, so that when the tape is running, the pressure of main-brake armature **21*b*** on the tape will not be excessive. For these reasons, three percent silicon steel was chosen as the magnetic material.

With the foregoing considerations in mind, the main brake 21 was designed to have a gap of three mils or less at each stator pole face, with the tape in place and with no current in the stator windings. The inductance of coil 113 was kept low in order to permit a fast rise to maximum current. With a potential of 115 volts, the current rises to a maximum of about two amperes in only 200 microseconds, using the driving circuit of Fig. 4. High speed motion pictures of the operation of the equipment indicate a movement of main-brake armature **21*b* in less than 200 microseconds. The gap between second armature 44 and stop-stator 42** is slightly more than three mils.

The present invention enables tapes to be run at speeds of 200 or more inches per second and to be stopped in a distance of about 65 mils without breaking. With a typical punched paper tape having 10 characters to the inch, this means that 2000 or more characters per second can be passed through the reading station and that the tape can be stopped easily without breaking and without losing information.

The apparatus herein described and illustrated is the preferred embodiment of the invention, but modifications and other embodiments may be made, and in the light of the disclosure will occur to those skilled in the art, without departing from the spirit and the scope of the invention; accordingly it is desired that the invention be not limited to the specific details described, but be considered as including all the modifications and equivalents which are embraced by the appended claims.

What is claimed is:

1. In apparatus for controlling the motion of an information-carrying tape along its longitudinal axis, including a reading station disposed along the path of said tape and adapted to abstract information from said tape, the combination comprising: means adapted to guide that portion of said tape at said reading station along a short horizontal plane path; continuously rotating means disposed along said horizontal plane path and adapted to drive said portion of said tape; means disposed at the end of said horizontal plane path and having a smoothly rounded surface adapted to deflect said tape out of said horizontal plane path into a vertically downward path; electromechanical means disposed along said horizontal plane path and adapted to arrest the motion of said portion of said tape moving in said horizontal plane path; and means disposed along said horizontal plane path beneath said tape and preceding said deflecting means and being so positioned and so adapted as to arrest the motion of that part of said tape moving in said vertically downward path after the motion of said portion of said tape moving in said horizontal plane path is arrested.

2. In apparatus for controlling the motion of an information-carrying tape along its longitudinal axis, said apparatus having a reading station disposed along the path of said tape and adapted to abstract information from said tape, the combination comprising: means adapted to guide that portion of said tape at said reading station along a short horizontal plane path; means disposed along said horizontal plane path following said reading station and adapted to drive said portion of said tape; means disposed at the end of said horizontal plane path and adapted to deflect said tape out of said horizontal plane path into a vertically downward path; means disposed along said horizontal plane path and preceding said reading station and adapted to arrest the motion of said portion of said tape; and means disposed along said horizontal plane path beneath said tape and preceding said deflecting means and being so positioned and so adapted as to arrest the motion of that part of said tape moving in said vertically downward path after the motion of said portion of said tape moving in said horizontal plane path is arrested.

3. In an apparatus for feeding an information-carrying tape past a reading station, the combination comprising: a brake located ahead of the reading station with reference to the direction of travel of said tape, said brake normally engaging said tape so as to apply a drag thereto and operable to apply additional pressure to said tape so as to stop the motion of at least an intermediate portion of said tape; a continuously operable driving means located beyond the reading station in the direction of travel of said tape and operable so as to engage the tape with sufficient driving force to overcome the normal drag applied to the tape by the brake and to pull the tape past the reading station; deflecting means disposed beyond the driving means in the direction of travel of said tape and adapted to change the direction of travel of said tape; means to cause the brake to operate so as to arrest the motion of at least said intermediate portion of said tape and simultaneously to cause the driving means to operate so as to disengage the driving force from the tape; and arresting means disposed beyond the driving means in the direction of travel of said tape and preceding said deflecting means, and adapted to arrest the motion of at least a second portion of said tape following said deflecting means after the motion of said intermediate portion of said tape has been arrested.

4. In an apparatus for feeding an information-carrying tape past a reading station, the combination comprising: means for isolating a short portion of said tape for the purpose of independently controlling the motion thereof; means for guiding said short portion of said tape past the reading station; a brake located along said short portion of said tape and ahead of said reading station with reference to the direction of travel of said short portion of said tape, said brake normally engaging said tape so as to apply a drag thereto and operable to apply additional pressure to said tape so as to stop the motion of said short portion of said tape; a continuously operable driving means located along said short portion of said tape and beyond said reading station in the direction of travel of said short portion of said tape and operable so as to engage the tape with sufficient driving force to overcome the normal drag applied to the tape by the brake and to pull the said short portion of said tape past the reading station; deflecting means located at the end of said short portion of said tape and adapted to change the direction of travel of said tape; arresting means located along said short portion of said tape beyond said driving means in the direction of travel of said short portion of said tape and preceding said deflecting means, and being so positioned and so adapted as to arrest the motion of at least a portion of said tape following said deflecting means after said short portion of said tape has been stopped; means to cause the brake to operate so as to arrest said short portion of said tape and simultaneously to cause the driving means to operate so as to disengage the driving force from the tape; and means to cause the brake to operate so as to release the tape and to cause the driving means to operate so as to again engage said short portion of said tape with driving force when further travel of the tape is desired.

5. In apparatus for controlling the motion of an information-carrying tape along its longitudinal axis, including a reading station disposed along the path of said tape and adapted to abstract information from said tape, and electronic means adapted to generate signals including stop signals and drive signals for controlling the motion of said tape in accordance with said information and conditions within said electronic means, the combination comprising: means adapted to guide that portion of said tape at said reading station along a short horizontal plane path; electromechanical braking means disposed along said horizontal plane path and preceding said reading station, said braking means comprising a fixed stator disposed beneath said tape and a movable armature disposed above said tape, said stator and said armature being adapted to permit easy passage of said tape therebetween in the absence of a said stop signal from said electronic means and adapted to grip said tape therebetween so as to arrest the motion of said portion of said tape when said electromechanical means is actuated by a said stop signal; driving means disposed along said horizontal plane path and following said reading station, said driving means comprising continuously rotating means disposed beneath said tape and in contact therewith and rotatable means disposed above said tape, said rotatable means being adapted to be operable electromechanically to apply pressure so as to press said tape against said continuously rotating means when actuated by a said drive signal from said electronic means and to remove said pressure when actuated by a said stop signal; guiding means disposed at the end of said horizontal plane path and having a smoothly rounded surface adapted to deflect said tape out of said horizontal plane path into a vertically downward path; and means disposed along said horizontal plane path beneath said tape and preceding said deflecting means and being so positioned and so adapted as to gradually arrest the motion of that part of said tape moving in said vertically downward path after the motion of said portion of said tape moving in said horizontal plane path is arrested.

6. In apparatus for controlling the motion of an information-carrying tape in one direction along its longitudinal axis, including a tape-supplying reel and a take-up reel, a reading station disposed along the path of said tape and adapted to abstract information from said tape and to generate data signals corresponding to said information, and electronic means adapted to receive said data signals and to generate control signals for controlling the motion of said tape in accordance with said data signals and conditions within said electronic means, the combination comprising: means adapted to guide an intermediate portion of said tape along a short horizontal plane path past said reading station; a first means adapted to control the motion of said intermediate portion of said tape in accordance with said control signals; a second means adapted to control the motion of a first portion of said tape including the amount of said tape on said tape-supplying reel; a third means adapted to control the motion of a last portion of said tape including the amount of said tape on said take-up reel; a first guide surface disposed at the end of said horizontal plane path and adapted to deflect said tape out of said horizontal plane path into a vertically downward path; and a second guide surface disposed along said horizontal plane path beneath said tape and substantially displaced from said first guide surface so as to provide a striking surface for the tape moving in said vertically downward path, said striking surface being shaped so as to gradually arrest the motion of the tape moving in said vertically downward path after the motion of said intermediate portion of said tape moving in said horizontal plane is arrested.

No references cited.